May 16, 1967  R. H. ALEXANDER ETAL  3,320,397
PRE-HEATING PROCESS
Filed June 24, 1963  2 Sheets-Sheet 1
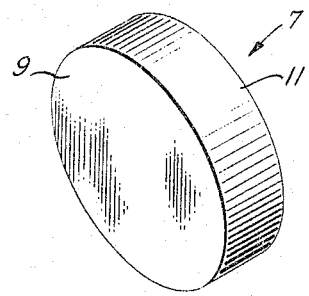
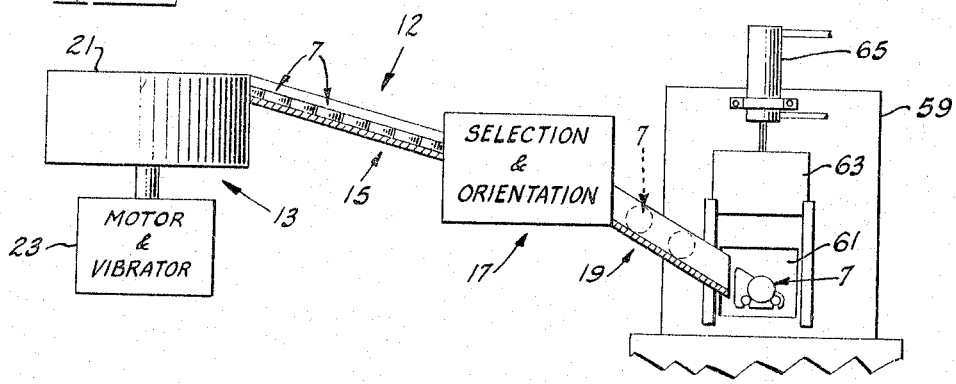
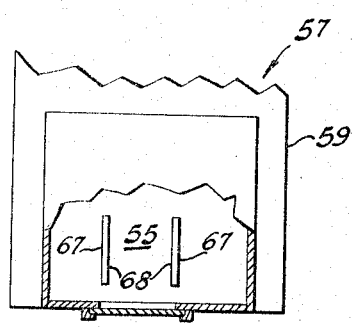
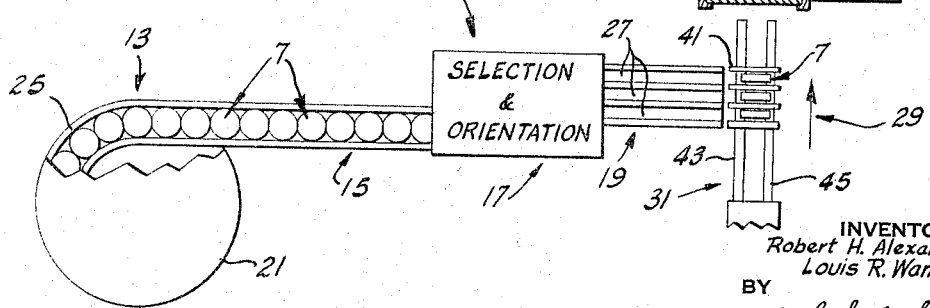
INVENTORS
Robert H. Alexander &
Louis R. Wanner
BY
Robert E. Strausser
ATTORNEY

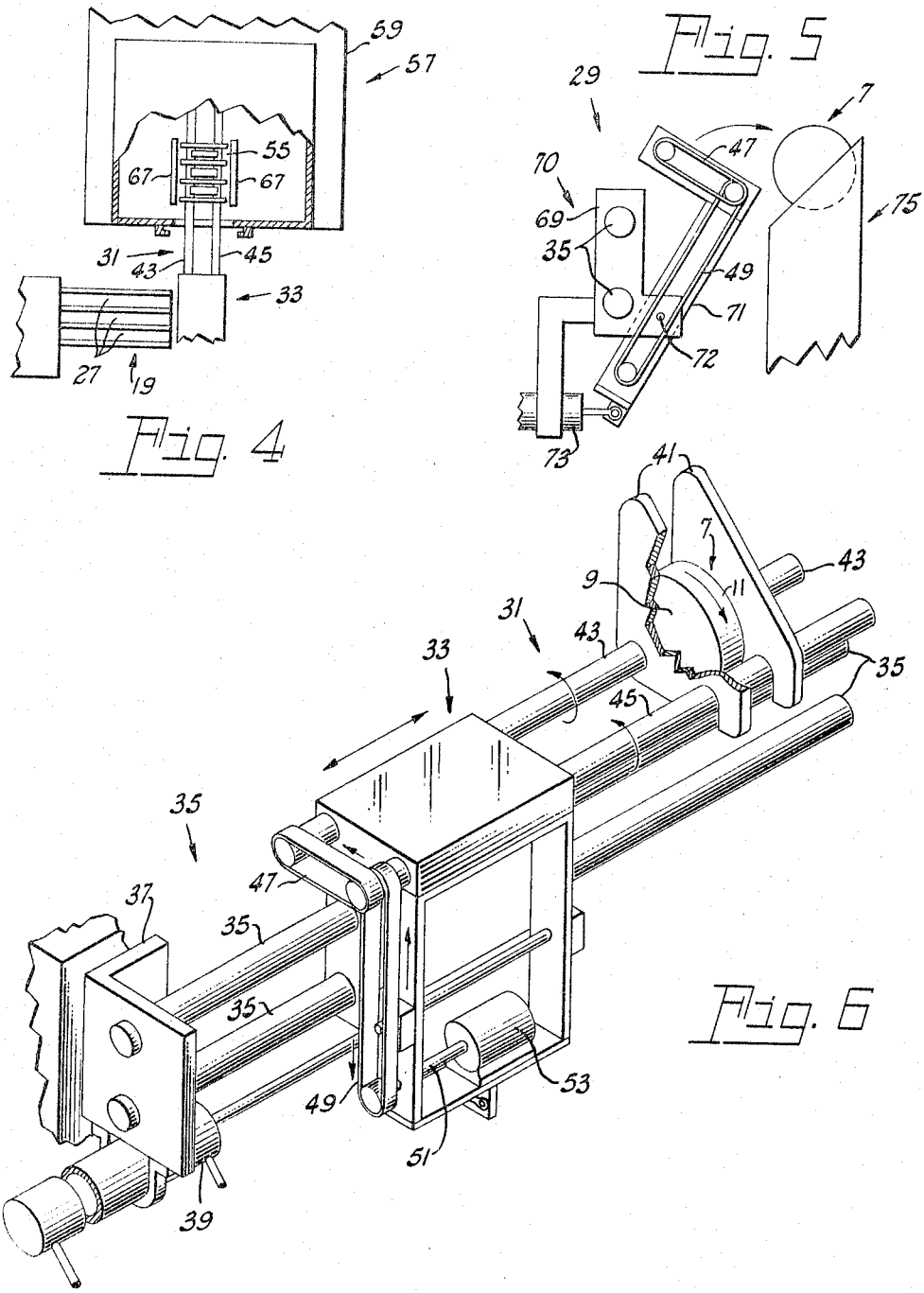

United States Patent Office 3,320,397
Patented May 16, 1967

3,320,397
PRE-HEATING PROCESS
Robert H. Alexander and Louis R. Wanner, Warren, Pa., assignors to Sylvania Electric Products Inc., a corporation of Delaware
Filed June 24, 1963, Ser. No. 290,003
5 Claims. (Cl. 219—10.69)

This invention relates to a process for pre-heating preforms adapted for use in a molding operation.

In molding operations and particularly in transfer molding processes of the plunger-type utilizing thermosetting materials, it has been found that pre-heating the material supplied to the molding apparatus greatly enhances the economy of the process. Moreover, the maximum advantages of pre-heating are obtained when the molding material is supplied to the molding apparatus at a temperature which is not only controllable but consistent and uniform throughout.

One of the more common processes for molding thermosetting materials is to supply a charge of powdered material to a die, compact the charge into a disc-shaped preform, deposit the preform on a continuous belt conveyor which transports the preform intermediate a pair of electrodes having an RF voltage thereon, dielectrically heat the preform, and discharge the preform into the molding apparatus.

Although the above process and processes similar thereto are prevalent and frequently encountered, it has been found that several important and outstanding defects are evident when applied to plunger-type molding. Moreover, dielectric heating which reduces previously known problems of case-hardening imposes limitations and restrictions in order to provide uniform heating and these limitations and restrictions are not evident in the above processes.

Regarding the fabrication of the preforms, thermosetting powdered materials are transported in bulk containers and it is well known that the bulk density therein varies due to the variation in particle size and distribution. The preforms are usually fabricated by charging a cylindrical die of fixed diameter with the powder and applying pressure thereto. As a result of the bulk density variation of the powders, the preform will vary either in density or in the dimension normal to the fixed diameter of the die. Although either the density or the dimension normal to the diameter of the preform may be controlled with relative ease, control of both the dimension and density has been found very expensive and impractical for high production applications.

In the above-mentioned process and processes similar thereto, disc-shaped preforms having a pair of surfaces of uniform diameter are usually deposited onto a conveyor belt such that one of the diametrically uniform surfaces contacts the belt. In this manner, the preform is conducted intermediate a pair of electrodes which are in a plane parallel to the uniform surfaces. Thereat, the preform is dielectrically heated.

Since the preform dimension normal to the electrodes or the preform density varies, it has been found that the heat distribution in the preform will vary. Further, when one surface of the preform is in continuous contact with the conveyor and a similar surface is uncontacted, the distribution of heat in the preform is nonuniform and heat is conducted from one surface by radiation and from a similar surface by conduction. Additionally, when the preforms are deposited on a conveyor means, some of the powdered material adheres to the conveyor and this layer of material is constantly changing. Thus, when the preform is conducted intermediate the electrodes, the varying layer of material is also disposed intermediate thereto which presents a continuously varying dielectric intermediate the electrodes and continuously varying heat applied to the preforms. Thus, it is an object of this invention to improve the heat distribution uniformity in a preform during the pre-heating thereof.

Another object of the invention is to enhance the pre-heating of preforms adapted for use in a transfer molding operation.

Still another object of the invention is to improve the consistency and repeatability of heat distribution in successive preforms continuously supplied in an automated process.

A further object of the invention is to reduce the deleterious effects of delivering nonuniformly pre-heated preforms to apparatus adapted to the molding thereof.

A still further object of the invention is to enhance the deposition of pre-heated preforms to the molding apparatus.

These and other objects are fulfilled in one embodiment of the invention by depositing a preform having a uniform dimension within a heating zone and continuously rotating the preform during the heating thereof. Thereafter, the preforms are discharged to a molding apparatus.

For a better understanding of the present invention, together with other and further objects, advantages, and capabilities thereof, reference is made to the following disclosure and appended claims in connection with the accompanying drawings in which:

FIGURE 1 is a perspective view of a preform adapted for use in a molding process.

FIGURE 2 is a diagrammatic illustration of the side elevation of a preform pre-heating apparatus, FIGURE 3 is a diagrammatic illustration of a plan view of the apparatus of FIGURE 2, FIGURE 4 is a diagrammatic illustration of a partial plan view of the apparatus of FIGURE 3, FIGURE 5 is a diagrammatic illustration of a side elevation of a conveyor means shown in FIGURE 6, and FIGURE 6 is a diagrammatic illustration of a perspective view of a conveyor means which forms a part of the apparatus.

In transfer molding processes and particularly in plunger-type molding of thermosetting materials, a preform having a desired configuration is usually compacted from powdered or granular materials. The preform is then pre-heated prior to deposition in the molding apparatus in order to reduce the time required for the actual molding process and the cost associated therewith. Normally, the preform is pre-heated to a temperature and at a pressure slightly below the polymerization temperature and pressure of the materials. Thermosetting materials are usually, not necessarily, pre-heated under atmospheric conditions to a temperature in the range of 175° C. to 295° C.

Thermosetting materials applicable to the process presented hereinafter are numerous and preferred materials or combinations of materials include phenol-formaldehyde compounds, urea-formaldehyde compounds, melamine-formaldehyde compounds, and phenolic-furfural compounds. These materials are commonly received in powdered or granular form and subsequently compacted to the desired shape as mentioned above.

One preferred preform configuration is illustrated in FIG. 1 wherein the disc-shaped preform 7 has a surface 9 of substantially uniform diameter and a peripheral surface 11 substantially normal thereto. This preform 7 may be fabricated by introducing a charge of thermosetting powders into a cylindrically-shaped die and applying pressure thereto by a plunger inserted therein.

The apparatus and pressures required for such a process are rather formidable and variations in the cylinder and plunger diametrical size are expensive and inconvenient while variations in pressure of the plunger present a minimum of problems. Further, accurate control of what are believed to be critical preform parameters can be readily obtained in a disc configuration.

In order to more effectively illustrate the process, a specific embodiment of a preferred apparatus will be explained hereafter. Briefly, FIG. 6 of the drawings shows an indexing conveyor and discharge means 29 having a continuously rotating surface 31. Also, FIG. 3 shows a heating means 57 having a heating zone 55 intermediate a pair of parallel spaced electrodes 67.

In the process, a charge of powdered thermosetting material is supplied to a cylindrical-shaped die and compacted into a disc-shaped preform 7. As mentioned above, the diameter of the cylinder is constant thereby providing a disc of substantially constant diameter. Also, the bulk density of the powdered material varies which permits variations in either the preform density or the preform dimension normal to the preform diameter. Preferably, preform density is maintained by substantially constant adjustment of the plunger pressure in conjunction with hardness testing of the preform using a Durometer hardness tester while the dimension normal to the preform diameter is allowed to vary in accordance with the bulk density variations of the material.

The disc-shaped preforms 7 having a substantially constant diameter and density and a variable dimension normal to the diameter thereof are deposited onto the continuously rotating surface 31 of the conveyor and discharge means 29 in a manner such that the peripheral surface 11 of the preforms 7 contacts the continuously rotating surface 31. In this manner the preforms 7 are continuously rotated about the diametrical axis thereof.

Numerous means are available and applicable for depositing preforms onto a continuously rotating surface so long as the preforms are axially rotated about a uniform dimension. Moreover, a multitude of conveyance means for transporting the preforms are available and almost all are appropriate so long as the axial rotation is not interrupted or discontinued.

Following, the axially rotating preforms 7 and the continuously rotating surface 31 are conducted through a heating zone. Alternately the rotating preforms 7 and surface 31 may be indexed into a heating zone, remain therein for a designated time period, and indexed therefrom.

While in the heating zone, the temperature of the preforms 7 is raised to a value which will eliminate the volatile materials therefrom and provide a minimum molding time and a maximum molding quality. Preferably, the preforms are pre-heated to a temperature just below the temperature and pressure required in the molding process for polymerization of the thermosetting material.

Referring to the heating means, numerous types of apparatus and heating means are available including infrared heating and forced air heating when the molding materials are in an uncompacted form. A preferred heating means is dielectric heating with RF energy and one of many techniques is illustrated by the previously mentioned apparatus shown in FIG. 3.

The disc-shaped preforms 7 in continuous axial rotation are disposed intermediate the parallel spaced electrodes 67 in a manner such that the surface 9 of substantially uniform diameter is normal to the parallel electrodes 67 and the peripheral surface 11 of the preforms 7, which has a variable dimension as previously explained, is substantially parallel to the electrodes 67. Thus, the spacing between each of the electrodes and the preforms remains substantially constant and the density of the preforms is substantially constant.

Further, the rotating surface 31 of the conveyor does not accumulate a varying layer of powdered materials thereon because of the continuous rotation thereof. Thus, the dielectric, if any, introduced intermediate the electrodes by the preform transporting means remains constant and unchanged.

Therefore, the substantially constant diameter and density of the preforms, the substantially constant dielectric introduced by the preform conveyor, and the substantially constant volatiles eliminated from the preforms provide a loss factor or relative tendency of materials to absorb energy when used as a dielectric, which is substantially constant. Also, the uniformity of spacing and dielectric intermediate the electrodes permits accurate location of the electrodes 67 just beyond the point of arcing or dielectric breakdown.

Additionally, the continuous rotation of the preforms 7 and the conveyor surface 31 provides a constantly changing point of contact therebetween and any heat loss from the preform through conduction to the rotating surface is uniformly distributed over the entire peripheral surface of the preforms. Thus, the preforms are uniformly heated and the heat is uniformly distributed therethrough.

Thereafter, the preforms are discharged to a molding apparatus in condition for subsequent processing. It is to be understood that the location of the preform discharge is dependent upon the removal technique as well as the molding apparatus location and may be either in or out of the heating zone as desired. Moreover, a preferred process, although many others are suitable, is to discharge the preforms by tilting the rotating surface of the conveyor and dropping the preforms into a chamber of the molding apparatus.

As a specific example of the process, disc-shaped preforms having a diameter of about 2.75 inches were formed from a powder known as Durez 21372 furnished by the Durez Plastics Division of the Hooker Chemical Corporation. These preforms were deposited and continuously rotated intermediate a pair of electrodes in a manner such that the diametrical surface of the preforms was normal to the electrode surfaces.

The electrodes had applied thereto a voltage of about 16 kv. at a frequency of approximately 82 megacycles and the preforms remained intermediate the electrodes for about 20 seconds. At the end of this time, the temperature of the preforms had reached approximately 250° C. whereupon the preforms were withdrawn and discharged to a plunger-type molding apparatus.

Referring to the drawings, an apparatus especially adapted to the previously presented process is illustrated wherein a conveyor and discharge means 29 is furnished preforms 7 by a supply means 12 immediately adjacent thereto. The conveyor and discharge means 29 continuously rotates the preforms 7 while conducting them through a nearby heating means 57 and then discharges the preforms 7 into a chamber 75 of a molding apparatus.

Referring to FIGURES 5 and 6, the conveyor and discharge means 29 comprises a rotating surface 31 having a pair of rods 43 and 45 journalled at housing 33 and extending therethrough. The rods 43 and 45 are continuously rotated by belts 47 and 49 driven from a shaft 51 extending from a motor 53 powered by an external source (not shown).

Further, the housing 33 is slidably engaged and supported by shafts 35 which are affixed to a plate 37 upheld by a support means 39. The housing 33 and the rotating surface 31 are moved along the shafts 35 by an indexing means (not shown). Also the separator plates 41 which are contiguous with the rotating surface 31 are at a substantially fixed distance from the housing 33.

Additionally, as illustrated in FIG. 5, the housing 33 has a fixed portion 69 and a pivotable portion 71 attached thereto at a pivot jointure 72. The pivotable portion 71 is interconnected to a support structure (not shown) and activated by pivot means 73 at one end thereof. At the opposite end the pivotable portion 71 has attached thereto the rotating surface 31 whereon the preforms 7 are disposed.

The supply means 12, illustrated in FIGS. 2 and 3, comprises a feed means 13 having a hopper 21 of the vibratory-type agitated by an externally powered motor and vibrator 23. The hopper 21 has an inclined track (FIG. 3) therein and affixed thereto from which the preforms 7 are fed to a carrier 15 which may be an ordinary continuous belt type carrier powered by an external source (not shown) which is activated in conjunction with the feed means 13.

The selection and orientation means 17 interconnecting the carrier 15 and chute means 19 selects preforms 7 from the carrier 15 and feeds them to the channels 27 of chute means 19 such that each preform 7 is received in a separate channel 27 wherein the peripheral surface 11 of the preform 7 contacts and is supported by the channel 27. Further, the chute means 19 (FIG. 1) is inclined thereby causing the preforms 7 to roll therethrough and exit from the channels 27 onto the rotating surface 31 of the conveyor means 29.

The heating means 57, illustrated in FIG. 2, which is located in the vicinity of the conveyor and discharge means 29 comprises an enclosure 59 having an aperture 61 in one surface thereof and a closure means 65 for activating a door 63 adapted for at least partially sealing the aperture 61 to prevent the escape of heat from the enclosure 59. Within the enclosure 59 may be located a pair of spaced electrodes 67 (FIG. 4) which are energized by an RF supply (not shown) and provide an RF field between the opposing surfaces 68 designated as the heating zone 55 wherein the preforms 7 are continuously rotated and heated.

It is to be understood that all of the necessary supporting structure, camming, and electrical means necessary to cooperatively activate and correctly locate and support the above-mentioned means are included in the apparatus and have been purposely omitted from the drawings in the interest of clarity and understanding.

In the operation of the apparatus, a quantity of preforms 7 is dumped into the hopper 21 of the feed means 13 wherein the vibration of the hopper 21 by the motor and vibrator 23 causes the preforms 7 to ascend the inclined track 25. Upon reaching the carrier 15, the preforms 7 are aligned and deposited thereon whereupon they are transported to the selection and orientation means 17.

The selection and orientation means 17 chooses a previously planned number of preforms 7 which are moved from the carrier 15 and caused to fall into the channels 27 of the chute means 19. The channels 27 of the chute means 19 the located such that each preform 7 lands in an individual channel 27 of the chute means 19. Further, the peripheral surface 11 of the preforms 7 contacts the chute means whereon it is supported.

Upon striking the inclined chute means 19, the preforms roll down the channels 27 and are deposited on the rotating surface 31 of the conveyor and discharge means 29 in a manner such that a contacting relationship exists between the peripheral surface 11 of the preforms 7 and the rotating surface 31 of the conveyor and discharge means 29. Further, the separator plates 41 restrict the preforms 7 to a plane which maintains the peripheral surface 11 and rotating surface 31 contactual relationship.

The conveyor and discharge means 29 advances the rotating surface 31 with the preforms 7 thereon into the heating zone 55 within the enclosure 59 of the heating means 57. Further, the door 63 is operated by the closure means 65 to permit entry and exit of the preforms 7 into the heating means 57. When the preforms 7 are in the heating zone 55 intermediate the electrodes 67, the advance of the conveyor and discharge means 29 is discontinued and the preforms 7 remain therein for a designated heating period.

During this designated period, the preforms 7, acting as a dielectric intermediate the electodes 67, are heated by energizing the electrodes 67 from an RF supply (not shown). The period of heating is, of course, dependent upon the spacing of the electrodes 67, the RF supply, the preform material composition, the desired temperature of the preforms 7 for subsequent molding, and numerous additional factors.

Upon reaching the desired pre-heat temperature, the conveyor and discharge means 29 withdraws the preforms 7 from the heating zone 55 to the original location thereof prior to the advance. Thereat, the rotating surface 31 of the conveyor and discharge means 29 is tilted by the pivot activating means 73 whereupon the preforms 7 are discharged and deposited in a chamber 75 of a molding apparatus for subsequent processing.

Thus, there has been provided a process for pre-heating preforms such that the heat distribution of the preform has a uniformity which, as far as is known, has been previously unobtainable. Further, the process has a consistency and repeatability especially adapted to repetitive as well as automated techniques. Moreover, the preform parameters necessary for heating uniformly are maintained within rigid control. Additionally, the presentation of uniformly heated preforms to molding apparatus reduces the costly maintenance formerly required when the preforms were not uniformly pre-heated.

While there have been shown and described what are at present considered the preferred embodiments of the invention, it will be obvious to those skilled in the art that various changes and modifications may be made therein without departing from the invention as defined by the appended claims.

What is claimed is:

1. A preform pre-heating process adapted for use in a molding operation comprising the steps of:
   depositing preforms of dielectric material into a heating zone, each of said preforms having a substantially uniform diametrical dimension and a peripheral surface in a plane normal thereto and said heating zone including a pair of spaced electrodes in planes substantially perpendicular to a diameter of the preforms, said preforms being disposed intermediate said electrodes and continuously rotated about the axis of said diametrical dimension by pressure exerted on a continuously changing portion of said peripheral surface;
   dielectrically heating said preforms at atmospheric pressure and to a temperature less than the temperature and pressure of polymerization of said material during a molding operation by electrically energizing said electrodes at an RF frequency; and
   discharging said preforms from said heating zone and to a molding operation.

2. The invention of claim 1 wherein the preforms between the electrodes are spaced from each other.

3. The process of claim 1 wherein the step of depositing preforms of dielectric material into a heating zone includes the continuous rotation of said preforms prior to, during, and after the step of dielectrically heating said preforms.

4. The process of claim 1 wherein the step of depositing preforms of dielectric material into a heating zone includes the steps of:
   contacting the peripheral surface of the preforms and a continuously rotating conveyor surface; and
   indexing said continuously rotating conveyor surface having the preforms thereon into and out of said heating zone.

5. The process of claim 4 wherein the step of discharging said preforms from said heating zone and to a molding operation includes tilting said continuously rotating conveyor surface.

(References on following page)

References Cited by the Examiner

UNITED STATES PATENTS

| | | | |
|---|---|---|---|
| 2,417,678 | 3/1947 | Cox | 219—10.73 X |
| 2,421,334 | 5/1947 | Kline et al. | 219—10.69 X |
| 2,575,426 | 11/1951 | Parnell | 219—388 |
| 2,872,740 | 2/1959 | Schaevitz | 34—68 |
| 3,041,435 | 6/1962 | Cameron | 219—10.69 |
| 3,053,961 | 9/1962 | Rodgers et al. | 219—10.69 |

RICHARD M. WOOD, *Primary Examiner.*

L. H. BENDER, *Assistant Examiner.*